Oct. 4, 1966  O. E. PHELPS ETAL  3,276,555
CLUTCH ASSEMBLY

Filed April 15, 1964  3 Sheets-Sheet 1

INVENTORS
ORVILLE E. PHELPS
BY MARTIN J. HERMANNS
Harold D. Shall
Walter E. Pavlick
ATTORNEYS Oct. 4, 1966  O. E. PHELPS ETAL  3,276,555
CLUTCH ASSEMBLY Filed April 15, 1964  3 Sheets-Sheet 2

INVENTORS
ORVILLE E. PHELPS
MARTIN J. HERMANNS
BY
Harold D. Shall
Walter E. Pavlick
ATTORNEYS

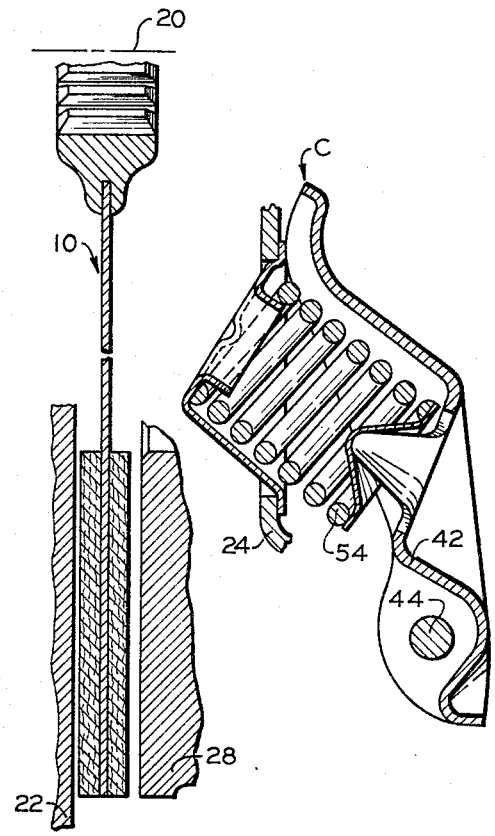
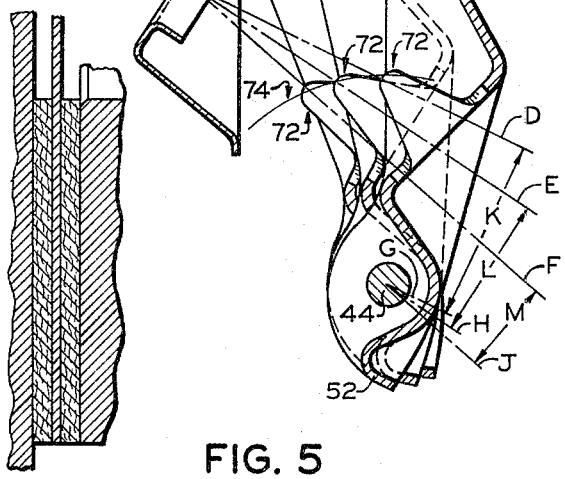
FIG. 4
FIG. 5

United States Patent Office 3,276,555
Patented Oct. 4, 1966

3,276,555
CLUTCH ASSEMBLY
Orville E. Phelps, Toledo, Ohio, and Martin J. Hermanns, Temperance, Mich., assignors to Dana Corporation, Toledo, Ohio, a corporation of Virginia
Filed Apr. 15, 1964, Ser. No. 359,936
20 Claims. (Cl. 192—68)

This invention relates generally to friction clutches and in particular to spring loaded friction clutches.

Friction clutches are widely used to drivingly connect a pair of relatively rotatable elements and usually include a driving member and a driven member. In the usual spring loaded clutch, the driving member includes an annular pressure plate which is axially movable so that one of its surfaces is operative as a friction surface and may be brought into contact with an annular friction surface of the driven member thereby engaging the driven member with the driving member. Resilient means is provided to cause the engagement of and to maintain driving contact between the friction surfaces, and means is provided to overcome the resilient means for disengagement of the friction surfaces. As the friction surface of the driven member wears, the position of the pressure plate is moved further in the direction of the friction surface by the resilient means and, as the pressure plate is so displaced, the engagement pressure of the resilient means is reduced.

By way of example, the resilient means for biasing the pressure plate toward the driven member may be compressed springs acting through release levers which are pivoted intermediate to their ends.

As the friction disk wears, the springs tend to elongate to compensate for the increased axial movement of the pressure plate. This elongation reduces the compression of the springs; thus, less load is applied by the springs to the pressure plate and by the pressure plate to the friction disk when the clutch is engaged. Eventually, this reduced load on the pressure plate leads to slippage between its surface and the surface of the friction disk when they are engaged. The consequence of this is an increase in the wear rate of the friction surfaces.

Friction clutches normally are provided with some type of manual means by which adjustments may be made to compensate for the friction surface wear, thereby maintaining the resilient clutch engaging load at a sufficient level. The manual means is, however, inconvenient and lacks an effective method for determining the amount of adjustment necessary. It is desirable, therefore, to provide an automatic means for maintaining a substantially constant resilient load on the pressure plate when the clutch is engaged.

It is an object of this invention to provide automatic means for making certain adjustments necessitated by friction surface wear in a friction clutch.

It is another object of this invention to provide means for maintaining substantially constant resilient load on the pressure plate of a friction clutch when the clutch is engaged.

It is another object of this invention to provide means for compensating for the loss of spring load caused by the wearing of friction surfaces in a spring loaded friction clutch.

It is a further object of this invention to provide means for reducing the wear rate of the friction surfaces in a friction clutch.

It is a still further object of this invention to reduce the load required for clutch disengagement.

Other and further objects of this invention will be apparent from the following description and claims, and may be understood by reference to the accompanying drawings which, by way of illustration, show a preferred embodiment of the invention and what is considered to be the best mode of applying the above principles.

In a preferred embodiment of this invention, a pressure plate is biased toward a friction disk by compression springs acting through release levers pivotally carried by the back plate and pivotal relative thereto about a pivot pin. The compression springs are seated at their reaction ends in a depression of the back plate at an angle relative to the axis of rotation of the pressure plate and are free to move slightly about their reaction ends. The springs carry on their action ends concave spring seats which pivotally contact cooperating cones carried by the release levers, the spring seats and cones thereby defining a fulcrum and pivotally connecting the spring and the lever. Each spring seat and lever cone cooperates with one another in such a manner that the distance from the fulcrum to the point at which the lever is pivotally connected to the back plate increases as the spring elongates. By varying the position of the fulcrum relative to the lever pivot, a mechanical advantage is used to compensate for the reduced compression of the springs occasioned by friction surface wear.

In the drawings:

FIG. 4 is a view taken along the lines 2—2 of FIG. 1 with some parts omitted for added clarity and showing certain parts of the clutch in the disengaged position; and FIG. 5 is a view taken along the lines 2—2 of FIG. 1 with some parts omitted for added clarity and showing the release lever and pressure plate in three operative positions.

Figure 1:
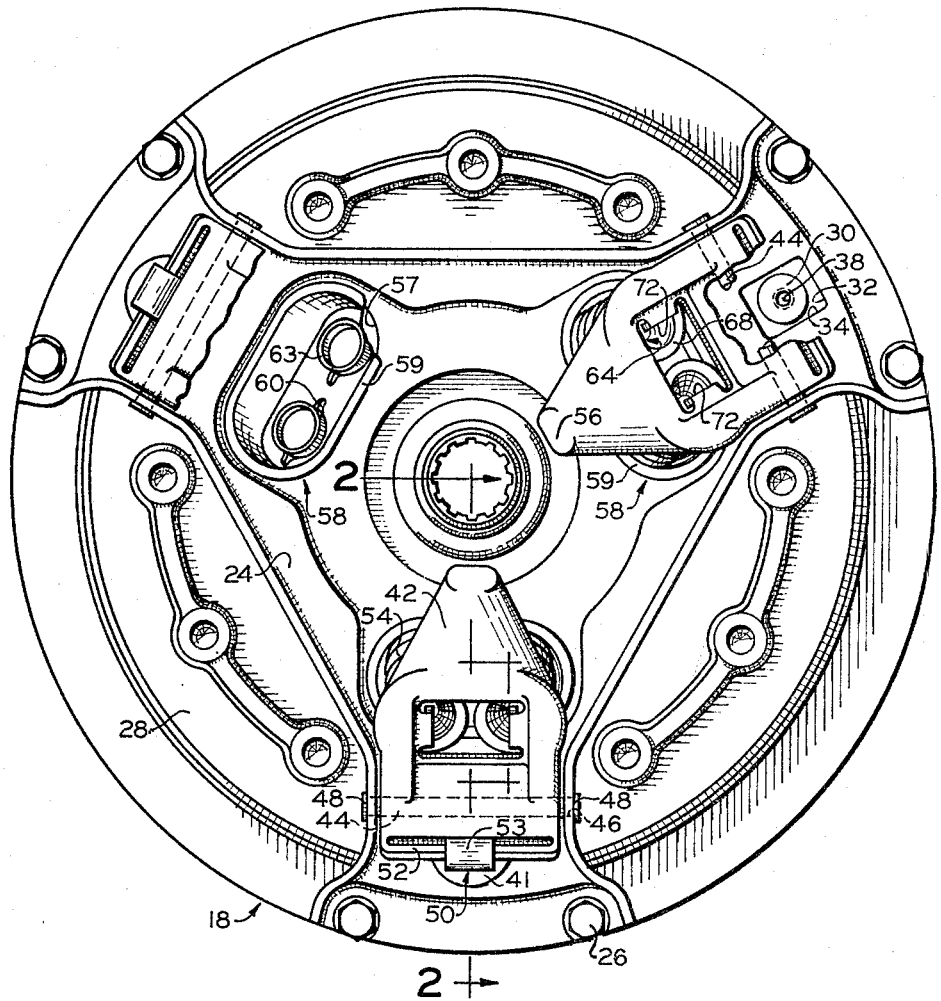
FIG. 1 is a rear view of a clutch embodying this invention with certain portions broken away and others omitted for added clarity.
Figures 2, 3:
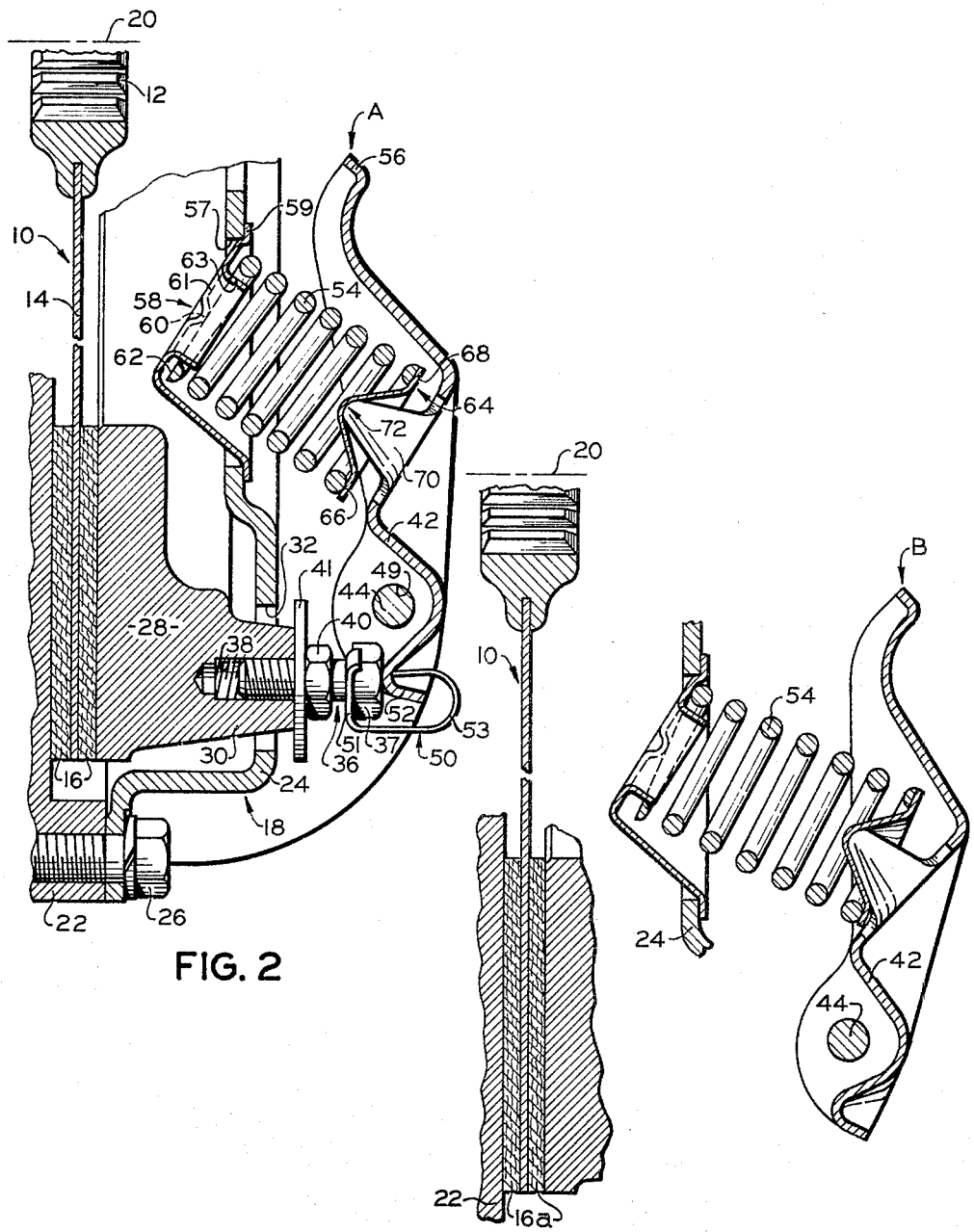
FIG. 2 is a sectional view taken on lines 2—2 of FIG. 1.
FIG. 3 is a view taken along the lines 2—2 of FIG. 1 with some parts omitted for added clarity and showing certain parts of the clutch in the engaged position after the friction disk has worn considerably.

Referring now to FIGS. 1 and 2 wherein the clutch is shown engaged and in its "new" condition a driven member of a spring loaded friction clutch is shown generally at 10 and comprises an internally splined hub 12, which is adapted to be drivingly connected to a splined shaft (not shown), and a disk 14 which extends radially from and is drivingly connected to the splined hub 12. The disk 14 has a pair of annular friction facings 16, one being suitably secured on either axial side of the disk at opposed positions from one another, and both being spaced radially outwardly from the hub 12.

A driving member, shown generally at 18, is rotatable relative to the driven member 10 about an axis 20. The driving member 18 comprises a flywheel 22, which is driven by a suitable source of rotative power (not shown), a reaction means or back plate 24, which is securely bolted to the flywheel 22 by a plurality of bolts 26, and a pressure plate 28. The pressure plate 28 is axially movable relative to the flywheel 22 and the back plate 24 and has a plurality of rearwardly extending, circumferentially spaced driving lugs 30 which project through openings 32 provided in the back plate 24. The pressure plate 28 is conventionally driven by the back plate 24 by means of the lugs 30 drivingly engaging the sides 34 of the openings 32 in the back plate.

The lugs 30 are an integral part of the pressure plate 28 and each has an adjusting screw shown generally at 36 threaded in an axially extending hole 38 provided therein. A lock nut 40 and a washer 41 are provided on the shank of each screw 36 to lock the screw in position and thereby provide manual means for preliminarily adjusting the axial position of the pressure plate 28 in a conventional manner.

Means is provided for axially moving the pressure plate 28 into and out of engagement with the driven member 10, which means is carried by the driving member 18 and comprises a plurality of release levers 42 each having an elongated radial axis which is radially disposed relative to the pressure plate 28 and each being pivoted about a pivot pin 44. The pivot pins 44 extend chordally relative to the back plate 24, are secured at their opposite ends to openings 46 in the back plate 24 by means of flanges 48 formed on their ends on the outside of the openings, and are received in spaced openings 49 in the release levers 42 so that the latter are pivotally mounted to the back plate.

A spring clip shown generally at 50 is provided to resiliently connect the head 37 of each screw 36 with the hooked shape outer end 52 of the cooperating release lever 42. Each spring clip 50 has a first portion 51 engaging the screw 36 under the head 37 thereof while a second portion 53 of the spring extends axially from the screw and hooks over the outer end 52 of the release lever 42 as is clearly shown in FIG. 2.

Means is provided to pivot the release levers 42 about the pivot pins 44 so that, as viewed in FIG. 2, as the lever 42 is pivoted clockwise about the pin 44 the end 52 thereof will press against the surface of the head 37 of screw 36 and urge the pressure plate 28 to the left into engagement with the driven member 10. As the lever 42 is pivoted counterclockwise about the pin 44, the end 52, by means of its connection with the screw 36 through the spring clip 50, will pull the pressure plate 28 to the right and thereby move the same to its disengaged position spaced from the driven member 10.

More particularly, the lever 42 extends radially inwardly from the pivot pin 44 and terminates at a radially inner end 56, which inner end is adapted to be engaged on the right side thereof by the usual throw-out bearing which is operative to pivot the same counterclockwise.

Intermediate the inner end 56 and the pivot pin 44, a pair of compression springs 54 operatively engage each of the levers 42 and bias the same clockwise about the pivot pin 44 so that the springs are operative to bias the pressure plate 28 against the driven member 10 through the cooperative action of the lever 42.

The back plate 24 has a plurality of circumferentially spaced, circumferentially elongated openings 57 each of which receives a reaction seat shown generally at 58. The reaction seat 58 includes a shoulder 59 extending entirely about its perimeter, which shoulder, as viewed in FIG. 2, abuts the right side of back plate 24 at the opening 57, and a base 61 which extends to the left through the opening 57 and is disposed at an angle relative to the back plate 24. The base 61 has two annular flanges 63 which extend generally to the right therefrom, each flange having an outside diameter smaller than the inside diameter of the springs 54 and extending into the spring cooperatively positioned therewith. Each base 61 has a pair of projections 60 located on opposed sides of each flange 63; the projections being disposed opposite one another on the diameter of the flange 63 which extends parallel to the pivot pins 44 and are concave relative to the base 61 and project generally toward the rear of the back plate 24.

A pair of compression springs 54 is received at their reaction ends 62 by, and extends into, each reaction seat 58. The reaction ends 62 of the springs 54 abut the projections 60 and are free to pivot slightly about these projections in a radial direction relative to the axis 20.

A spring seat shown generally at 64 is received by the action end 66 of each of the springs 54. Each seat 64 is substantially conical with a rounded apex and is disposed convexly with respect to the spring 54 and extends thereinto and has an integral peripheral flanged shoulder 68 which overlaps and engages the right side of the action end 66 of the spring 54.

A pair of generally triangularly shaped projections 70 each having a rounded apex are formed integrally with each lever 42 and each extends generally to the left therefrom into and pivotally engages one of the seats 64 and forms a compensating means in the form of a fulcrum 72 therewith. The plane defined by each projection 70 is disposed perpendicularly with respect to the pivot pins 44.

The distance from the fulcrum 72 to the pivot pin 44 is greater than the distance from the pivot pin 44 to the surface of the head 37 which is acted on by the outer end 52 of the release lever 42. Because of this and as viewed in FIG. 2, the clockwise urging force on the lever 42 from the spring 54 enjoys a mechanical advantage over the counterclockwise reaction loads imposed on the lever 42 by the pressure plate 28. In addition, there is an appreciable mechanical advantage in the disengagement of the clutch, for the fulcrum 72 is closer to the pivot pin 44 than is the radial inner end 56 of the lever 42 which is engaged by the throw-out bearing.

Referring now to FIG. 3, the clutch is shown in its engaged position after substantial wear of the friction facings 16a of the driven member 10 has occurred. Accordingly, in order to pressingly engage the driven member, the pressure plate 28 has moved axially further from the back plate 24 and towards the flywheel 22 which movement was accomplished by the elongation of the springs 54 and the release lever 44 pivoting clockwise about the pin 44 from its engaged position indicated at A in FIG. 2, when the clutch was new, to the position indicated at B in FIG. 3, the spring 54 having pivoted radially toward the axis 20.

In FIG. 4, the clutch is shown in its disengaged position wherein the pressure plate 28 has moved axially toward the back plate 24 and away from the driven member 10 and the flywheel 22. This has been accomplished by a throw-out bearing (not shown) pressing on the radially inner end of the release lever 42 and pivoting the same counterclockwise about the pivot pin 44 from its position indicated at A or B to the position shown at C. In so moving, the release lever 42 has compressed the spring 54 and the latter has pivoted radially away from the axis 20.

Referring now to FIG. 5, wherein the lever 42 is shown in its above described three positions A, B and C, three lines have been drawn from the projection 60 of the reaction seat 58 through the fulcrum 72; the line D being drawn through the fulcrum 72 when the lever is in its "worn" position indicated at B, the line E being drawn through the fulcrum when the lever is in its "new" engaged position indicated at A and the line F being drawn through the fulcrum 72 when the lever is in its disengaged position indicated at C. These lines D, E and F also represent the axis of the spring 54 as it is radially pivoted about the projections 60 when the release lever 42 is pivoted about the pivot pin 44.

Corresponding lines G, H and J are drawn through the center of the pivot pin 44 and parallel to the lines D, E and F respectively, and the distance between the parallel lines D–G, E–H and F–J are indicated respectively by the lines K, L and M and represent the effective distance from the pivot pin 44 to the point at which the force of the spring 54 is applied to the lever 42.

As the compression spring 54 is elongated and compressed, as occurs at times of clutch engagement and disengagement, the seat 64 and the projection 70 are induced to cooperate with one another so that the spring pivots radially slightly about the projection 60, thereby changing the direction of the force exerted by the spring, and the fulcrum 72 moves along an arc 74 relative to the pivot pin 44. As the lever 42 rotates clockwise the effective distance from the pivot pin 44 to the point where the force of the spring 54 is applied to the lever 42 is increased, thus in FIG. 5 the distance "K" is greater than the distance "L" which in turn is greater than the distance "M."

The effective distance from the outer end 52 of the lever 42, where the lever acts on the surface of the head 37, to the pivot pin 44 remains substantially constant, since the reaction force of the pressure plate 28 is always in the same direction and the outer end moves over an arc having a much smaller radius than the arc 72, so that the mechanical advantage of the spring 54 is varied according to the pivoted location of the lever 42 and the corresponding position of the spring 54. In particular, as the lever 42 rotates clockwise from the position C to the position B, the mechanical advantage of the force of the spring 54 over the reactive force of the pressure plate 28 is increased.

As the friction facings 16 wear, the release lever 42 must pivot further in a clockwise direction to engage the pressure plate 28 with the disk 14 thereby requiring the spring 54 to elongate and lose compression. To compensate for this reduced compression, the mechanical advantage of the spring 54 is increased due to the increase in the distance from the fulcrum 72 to the pivot pin 44. This system may be designed, by choosing the proper dimensions and springs, to have the compensating factors directly proportional to the loss of compression in the springs 54 so that the engaging pressure between the driven member 10 and the driving member 18 is substantially uniform throughout the life of the friction facings 16.

Another advantage of this system is that less load is required for clutch disengagement, for, as the springs 54 are compressed, the effective distance from the fulcrum 72 to the pivot pin 44 is decreased, while the distance from the radially inner end 56 to the pivot 44 changes at a much lower rate, since the motion of the throw-out bearing is always in the same direction. This results in an additional mechanical advantage for the disengagement of the clutch.

From the foregoing it is apparent that automatic means have been provided for making certain adjustments necessitated by wear in a friction clutch, which means compensates for the loss of spring load caused by the wearing of friction surfaces, and which means reduces the load required for clutch disengagement.

While only a single embodiment of this invention has been shown and described, it is understood that many changes can be made therein without departing from the scope of this invention as defined by the following claims.

What is claimed is:

1. A clutch comprising in combination,
   (a) a driven member,
   (b) a driving member including
      (1) a reaction means,
      (2) a pressure plate,
      (3) said pressure plate being disposed adjacent said driven member and adapted to be moved into and out of driving engagement therewith,
      (4) means connecting said pressure plate to said reaction means for unitary rotation and relative axial movement,
      (5) and resilient release means carried by said reaction means and connected to said pressure plate for urging the latter toward said driven member and into driving frictional engagement therewith,
      (6) said resilient release means including effectiveness compensating means for constantly increasing the effectiveness of said resilient means to apply the urging load thereof on said pressure plate as said pressure plate moves toward said driven member.

2. A spring loaded clutch comprising in combination
   (a) coaxial driving and driven members,
   (b) said driving member including
      (1) a reaction member disposed in axially spaced relationship relative to said driven member,
      (2) a pressure plate drivingly connected for unitary rotation to said reaction member and axially movable relative thereto and disposed adjacent to said driven member,
      (3) a lever means,
      (4) pivoting means pivotally connecting said lever means to said reaction member and defining a pivot point,
      (5) means connecting said lever means to said pressure plate,
      (6) said lever means being operative upon pivotal movement about said pivot point in a first direction relative to said reaction member to urge said pressure plate axially into engagement with said driven member and being operative upon pivotal movement in a second direction about said pivot point relative to said reaction member to urge said pressure plate axially away from said driven member and into a disengaged position, and said lever means having an engaged position wherein said pressure plate is in engagement with said driven member,
      (7) resilient means having an action and a reaction end with the reaction end reacting against said reaction member and the action end acting upon said lever means at an action point displaced a distance from said pivot point and urging the lever means to pivot about said pivot point in said first direction,
      (8) and means connecting said resilient means to said reaction member and to said lever means for constantly increasing the effective distance between said action point and said pivot point upon pivotal movement of said lever means in said first direction.

3. A spring loaded clutch comprising in combination
   (a) coaxial driving and driven members,
   (b) said driving member including
      (1) a reaction member disposed in axially spaced relationship relative to said driven member,
      (2) a pressure plate drivingly connected for unitary rotation to said reaction member and axially movable relative thereto and disposed adjacent said driven member,
      (3) a lever means,
      (4) pivot means pivotally connecting said lever means to said reaction member and defining a pivot point,
      (5) means connecting said lever means to said pressure plate,
      (6) said lever means being operative upon pivotal movement in a first direction relative to said reaction member to urge said pressure plate axially into engagement with said driven member and being operative upon pivotal movement in a second direction relative to said reaction member to urge said pressure plate axially away from said driven member and into a disengaged position,
      (7) resilient means having an action and a reaction end with the reaction end acting against said reaction member and the action end acting upon said lever means at an action point displaced from said pivot point and pivoting said lever means in said first direction,
      (8) and compensating means engaging the action end of said resilient means and said lever means and operatively connecting the same,
      (9) said compensating means being operative to increase the effective distance between said action point and said pivot point upon pivotal movement of said lever means in said first direction.

4. A spring loaded clutch according to claim 3 wherein said compensating means comprises fulcrum means pivotally connecting said resilient means to said lever means.

5. A spring loaded clutch according to claim 4 wherein means pivotally connects the reaction end of said resilient means to said reaction member.

6. A clutch comprising in combination,
 (a) a rotatable driven member,
 (b) a pressure plate and a back plate disposed coaxially with, axially spaced from and rotatable relative to said driven member,
 (c) means connecting said pressure plate to said back plate for unitary rotation and axial movement relative thereto,
 (d) said pressure plate being disposed adjacent said driven member and adapted to be urged into engagement therewith,
 (e) a plurality of lever means having a radially extending elongated axis,
 (f) pivot means pivotally connecting said lever means to said back plate for pivotal movement about an axis normal to said radial axis,
 (g) means connecting said lever means to said pressure plate,
 (h) said lever means being operative upon pivotal movement in a first direction relative to said back plate to urge said pressure plate axially into engagement with said driven member and being operative upon pivotal movement in a direction opposite to said first direction to urge said pressure plate axially away from said driven member,
 (i) resilient means having spaced action and reaction ends,
 (j) said reaction end reacting against said back plate,
 (k) compensating means engaging said action end and engaging said lever means at an action point which is radially spaced from said pivot means and positioned so that said resilient means biases said lever means in said first direction,
 (l) said compensating means being operative to increase the effective distance between said action point and said pivot means upon pivotal movement of said lever means in said first direction.

7. A clutch comprising in combination,
 (a) a rotatable driven member,
 (b) a pressure plate and a back plate disposed coaxially with, axially spaced from and rotatable relative to said driven member,
 (c) means connecting said pressure plate to said back plate for unitary rotation and axial movement relative thereto,
 (d) said pressure plate being disposed adjacent said driven member and adapted to be urged into engagement therewith,
 (e) a plurality of lever means each having a radially extending axis,
 (f) pivot means pivotally connecting each of said lever means to said back plate for pivotal movement about an axis normal to said radial axis,
 (g) means connecting each of said lever means to said pressure plate,
 (h) said lever means being operative upon pivotal movement in a first direction relative to said back plate to urge said pressure plate axially into engagement with said driven member and being operative upon pivotal movement in a direction opposite to said first direction to urge said pressure plate axially away from said driven member,
 (i) resilient means having axially spaced action and reaction ends,
 (j) said reaction end reacting against said back plate,
 (k) first fulcrum means having a first and second portion with said first portion being carried by said action end and said second portion having a fulcrum point thereon and being integral with said first portion and being displaced from said first portion toward said reaction end,
 (l) second fulcrum means pivotally engaging said first fulcrum means at the fulcrum point on the second portion of said first fulcrum means and with said second fulcrum means being carried by said lever means at a position which is radially spaced from said pivot means and disposed so that said resilient means biases said lever means to pivot in said first direction,
 (m) whereby the effective distance between said fulcrum point and said pivot means increases as said lever means pivots in said first direction.

8. A clutch comprising in combination,
 (a) a rotatable driven member,
 (b) a back plate disposed coaxially with and axially spaced from said driven member,
 (c) a pressure plate disposed coaxially with and intermediate said driven member and said back plate and adapted to be urged into engagement with said driven member,
 (d) means connecting said pressure plate to said back plate for unitary rotation and axial movement relative thereto,
 (e) a plurality of lever means each having a radially extending elongated axis,
 (f) pivot means pivotally connecting each of said lever means to said back plate for pivotal movement about an axis normal to said elongated axis and with said elongated axis disposed radially with respect to said back plate so that each of said lever means has radial inner and outer ends,
 (g) said pivot means being pivotally connected to each of said lever means at a point intermediate said ends,
 (h) means connecting each of said lever means to said pressure plate at a position displaced in a first radial direction from said pivot means,
 (i) said lever means being operative upon pivotal movement in a first direction relative to said back plate to urge said pressure plate axially into engagement with said driven member and being operative upon pivotal movement in a direction opposite to said first direction to urge said pressure plate axially away from said driven member,
 (j) resilient means having axially spaced action and reaction ends,
 (k) means pivotingly connecting said reaction end for reacting against said back plate,
 (l) first fulcrum means having a first and a second portion with said first portion being carried by said action end and said second portion having a fulcrum point thereon and being integral with said first portion and being displaced from said first portion toward said reaction end,
 (m) second fulcrum means pivotally engaging said first fulcrum means at the fulcrum point on the second portion thereof and with said second fulcrum means being carried by said lever means at a position radially spaced from said pivot means in a direction radially opposite said first radial direction and disposed so that said resilient means biases said lever means to pivot in said first direction,
 (n) whereby the effective distance between said fulcrum point and said pivot means increases as said lever means pivots in said first direction.

9. A clutch comprising in combination,
 (a) a rotatable driven member,
 (b) a back plate disposed coaxially with and axially spaced from said driven member,
 (c) a pressure plate disposed coaxially with and intermediate said driven member and said back plate and adapted to be urged into engagement with said driven member, (d) means connecting said pressure plate to said back plate for unitary rotation and axial movement relative thereto,
(e) a plurality of lever means each having a radially extending elongated axis,
(f) pivot means pivotally connecting each of said lever means to said back plate for pivotal movement about an axis normal to said elongated axis and with said elongated axis disposed radially with respect to said back plate so that each of said lever means has radially inner and outer ends,
(g) said pivot means being pivotally connected to each of said lever means at a point intermediate said ends,
(h) means connecting each of said lever means to said pressure plate at a position disposed radially outwardly from said pivot means,
(i) said lever means being operative upon pivotal movement in a first direction relative to said back plate to urge said pressure plate axially into engagement with said driven member and being operative upon pivotal movement in a direction opposite to said first direction to urge said pressure plate axially away from said driven member,
(j) resilient means having spaced action and reaction ends,
(k) said reaction end acting against said back plate and said action end being disposed axially relative thereto,
(l) first fulcrum means having a first and a second portion with said first portion being carried by said action end and said second portion having a fulcrum point thereon and being integral with said first portion and being displaced from said first portion axially toward said reaction end,
(m) second fulcrum means pivotally engaging said first fulcrum means at the fulcrum point on said second portion thereof and being carried by said lever means at a position spaced radially inwardly from said pivot means and disposed so that said resilient means biases said lever means to pivot in said first direction,
(n) whereby the effective distance between said fulcrum point and said pivot means increases as said lever means pivots in said first direction.

10. A clutch comprising in combination,
(a) a back plate having axially opposed front and rear portions,
(b) a driven member disposed coaxially with said back plate and axially spaced from the front portion thereof,
(c) a pressure plate disposed coaxially with said back plate and driven member and intermediate the same and adapted to be urged into engagement with said driven member,
(d) means connecting said pressure plate to said back plate for unitary rotation and axial movement relative thereto,
(e) a plurality of lever means each having a radially elongated axis and disposed rearwardly of and radially with respect to said back plate so that each of said lever means has a radially inner and outer end,
(f) pivot means pivotally connecting each of said lever means to the rear portion of said back plate for pivotal movement about an axis normal to said elongated axis with said pivot means being connected to said lever means at a point intermediate its radial inner and outer ends,
(g) means connecting each of said lever means to said pressure plate at a position disposed radially outwardly from said pivot means,
(h) said lever means being operative upon pivotal movement of the inner end thereof away from said back plate to urge said pressure plate axially into engagement with said driven member and being operative upon movement of the inner end thereof toward said back plate to urge said pressure plate axially away from said driven member,
(i) resilient means having spaced action and reaction ends,
(j) said reaction end reacting against said back plate and said action end being disposed axially rearwardly therefrom and from the back portion of said back plate,
(k) first fulcrum means having a first and a second portion with said first portion carried by said action end and said second portion having a fulcrum point thereon and being integral with said first portion and displaced axially from said first portion toward said reaction end,
(l) second fulcrum means pivotally engaging said first fulcrum means at said fulcrum point on the second portion thereof and being carried by said lever means at a position spaced radially inwardly from said pivot means and disposed so that said resilient means biases said lever means to pivot in said first direction,
(m) whereby the effective distance between said fulcrum point and said pivot means increases as the inner end of said lever means pivots away from said back plate.

11. A clutch comprising in combination,
(a) a back plate having axially opposed front and rear portions,
(b) a driven member disposed coaxially with said back plate and axially spaced from the front portion thereof,
(c) a pressure plate disposed coaxially with said back plate and driven member and intermediate the same and adapted to be urged into engagement with said driven member,
(d) means connecting said pressure plate to said back plate for unitary rotation and axial movement relative thereto,
(e) a plurality of lever means each having a radially elongated axis and disposed rearwardly of and radially with respect to said back plate so that each of said lever means has a radially inner and outer end,
(f) pivot means pivotally connecting each of said lever means to the rear portion of said back plate for pivotal movement about an axis normal to said elongated axis with said pivot means being connected to said lever means at a point intermediate its radial inner and outer ends,
(g) means connecting each of said lever means to said pressure plate at a position disposed radially outwardly from said pivot means,
(h) said lever means being operative upon pivotal movement of the inner end thereof away from said back plate to urge said pressure plate axially into engagement with said driven member and being operative upon movement of the inner end thereof toward said back plate to urge said pressure plate axially away from said driven member,
(i) a coiled compression spring cooperatively disposed with each of said lever means and having action and reaction ends,
(j) projection means carried by said back plate at a position disposed radially inwardly from each of said pivot means,
(k) said reaction end of said coiled spring pivotally engaging said projection means so that said coiled spring is operative to pivot radially about said projection means while reacting against said back plate and said action end being disposed axially rearwardly of said reaction end,
(l) a first fulcrum means having a first and a second portion with said first portion engaging the action end of each of said springs and a second portion having a fulcrum point thereon and being integral with said first portion and displaced from said first portion in a direction axially toward said reaction end, (m) second fulcrum means pivotally engaging said first fulcrum means at said fulcrum point on the second portion thereof and being carried by said lever means at a position spaced radially inwardly from said pivot means and disposed so that said coiled spring biases said lever means to pivot in said first direction, (n) whereby the effective distance between said fulcrum point and said pivot means increases as the inner end of said lever means pivots away from said back plate and simultaneously with said change in fulcrum point distance said coiled spring pivots radially about said projection means.

12. A clutch comprising in combination, (a) a back plate having axially opposed front and rear portions, (b) a driven member disposed coaxially with said back plate and axially spaced from the front portion thereof, (c) a pressure plate disposed coaxially with said back plate and driven member and intermediate the same and adapted to be urged into engagement with said driven member, (d) means connecting said pressure plate to said back plate for unitary rotation and axial movement relative thereto, (e) a plurality of lever means each having a radially elongated axis and disposed rearwardly of and radially with respect to said back plate so that each of said lever means has a radially inner and outer end, (f) pivot means pivotally connecting each of said lever means to the rear portion of said back plate for pivotal movement about an axis normal to said elongated axis with said pivot means being connected to said lever means at a point intermediate its radial inner and outer ends, (g) means connecting each of said lever means to said pressure plate at a position disposed radially outwardly from said pivot means, (h) said lever means being operative upon pivotal movement of the inner end thereof away from said back plate to urge said pressure plate axially into engagement with said driven member and being operative movement of the inner end thereof toward said back plate to urge said pressure plate axially away from said driven member, (i) a coiled compression spring cooperatively disposed with each of said lever means and having an action and a reaction end, (j) said compression springs being substantially cylindrical and coiled about an axially extending central opening, (k) projection means carried by said back plate at a position disposed radially inwardly from each of said pivot means, (l) said reaction end of said coiled spring pivotally engaging said projection means so that said coiled spring is operative to pivot radially about said projection means while reacting against said back plate and said action end being disposed axially rearwardly of said reaction end, (m) a first fulcrum means having a first and a second portion with said first portion engaging the action end of each of said coiled springs and said second portion formed integrally with said first portion and displaced into the central opening in said spring axially toward the reaction end thereof, (n) second fulcrum means carried by said lever means at a position spaced radially inwardly from said pivot means and projecting axially therefrom into the central opening in said spring and pivotally engaging the second portion of said first fulcrum means so that said pivotal engagement therebetween forms a fulcrum point and said spring biases said lever means to pivot in said first direction, (o) whereby the effective distance between said fulcrum point and said pivot means increases as the inner end of said lever means pivots away from said back plate.

13. A clutch comprising in combination, (a) a rotatable driven member, (b) a back plate disposed coaxially with and axially spaced from said driven member, (c) a pressure plate disposed coaxially with an intermediate said driven member and said back plate and adapted to be urged into engagement with said driven member, (d) means connecting said pressure plate to said back plate for unitary rotation and axial movement relative thereto, (e) a plurality of lever means each having a radially extending elongated axis, (f) pivot means pivotally connecting each of said lever means to said back plate for pivotal movement about an axis normal to said elongated axis and with said elongated axis disposed radially with respect to said back plate so that each of said lever means has radially inner and outer ends, (g) said pivot means being pivotally connected to each of said lever means at a point intermediate said ends, (h) means connecting each of said lever means to said pressure plate at a position disposed radially outwardly from said pivot means, (i) said lever means being operative upon pivotal movement in a first direction relative to said back plate to urge said pressure plate axially into engagement with said driven member and being operative upon pivotal movement in a direction opposite to said first direction to urge said pressure plate axially away from said driven member, (j) resilient means carried by said back plate and biasing said lever means to pivot in said first direction so that said lever means moves said pressure plate into engagement with said driven member so that said resilient means imposes its resilient load on said pressure plate and biases the same into engagement with said driven member, (k) said lever means and said resilient means including compensating connecting means for maintaining said resilient load on said pressure plate substantially constant as the latter moves further towards the driven member from the normally engaged position as a result of wear of the driven member.

14. A clutch comprising in combination, (a) a rotatable driven member, (b) a back plate disposed coaxially with and axially spaced from said driven member, (c) a pressure plate disposed coaxially with and intermediate said driven member and said back plate and adapted to be urged into engagement with said driven member, (d) means connecting said pressure plate to said back plate for unitary rotation and axial movement relative thereto, (e) a plurality of lever means each having a radially extending elongated axis, (f) pivot means pivotally connecting each of said lever means to said back plate for pivotal movement about an axis normal to said elongated axis and with said elongated axis disposed radially with respect to said back plate so that each of said lever means has radially inner and outer ends, (g) said pivot means being pivotally connected to each of said lever means at a point intermediate said ends, (h) means connecting each of said lever means to said pressure plate at a position disposed radially outwardly from said pivot means, (i) said lever means being operative upon pivotal movement in a first direction relative to said back plate to urge said pressure plate axially into engagement with said driven member and being operative upon pivotal movement in a direction opposite to said first direction to urge said pressure plate axially away from said driven member, (j) resilient means having an action and a reaction end with the reaction end reacting against said back plate and the action end acting upon said lever means at an action point displaced radially inwardly from said pivot means and urging said lever to pivot about said pivot means in said first direction, (k) and means connecting said resilient means to said back plate and to said lever means and being operative to constantly increase the distance between said action point and said pivot means upon pivotal movement of said lever means in said first direction.

15. A spring loaded friction clutch comprising in combination,
  (a) an annular driven member having a central axis of rotation and axially opposed annular friction surfaces,
  (b) a rotatable flywheel disposed adjacent and coaxially with said driven member,
  (c) a back plate having front and rear portions and disposed coaxially with said flywheel and positioned with said driven member between the same and said flywheel and with the front portion facing said driven member and having a plurality of circumferentially spaced lug receiving openings therein,
  (d) means securedly connecting said back plate and flywheel for unitary rotation,
  (e) a pressure plate having front and rear faces and being disposed coaxially with and positioned between said driven member and back plate with its front face facing said driven member and its rear face facing said back plate and having a plurality of lug means with each of said lug means projecting into one of said openings of said plurality of lug receiving openings and connecting said pressure plate and said back plate for unitary rotation and relative axial movement,
  (f) a plurality of circumferentially spaced release levers each having an elongated axis and being displaced rearwardly of said back plate with their elongated axis disposed radially with respect to said back plate and having radially inner and outer ends,
  (g) one lever of said plurality of levers being disposed with its outer end adjacent to each of said lug means,
  (h) means operatively connecting each of said lug means to the outer end of the lever adjacent thereto,
  (i) pivot means pivotally connecting each of said lever means to the back portion of said back plate for pivotal movement about an axis normal to the elongated axis thereof and being connected to said levers at a pivot point intermediate the inner and outer ends thereof and closer to the outer end than to the inner end,
  (j) a plurality of projection means carried by said back plate and with one projection means of said plurality of projection means being axially aligned with one of said levers and disposed radially so as to be aligned with a position on said lever intermediate the pivot point and the inner end thereof,
  (k) a coil compression spring having a central opening and being disposed between each of said projection means and the lever aligned therewith and having action and reaction ends with the reaction end thereof engaging said projection means and being pivotal thereabout so that said spring may pivot toward and away from the axis of said back plate and with the action end thereof positioned rearwardly of said reaction end and cooperatively disposed with the lever aligned with the projection means engaged by said spring,
  (l) a cup shaped first pivoting member engaging the action end of each of said springs and disposed concavely with respect thereto with the apex thereof projecting into said spring,
  (m) and a second pivoting member carried by each of said levers at a point intermediate the inner end and pivot point thereon and projecting axially forwardly therefrom into and engaging the apex of the first pivoting member of the spring cooperatively disposed therewith and defining a fulcrum point therewith,
  (n) said coiled springs being operative to urge the inner ends of said levers in a first direction away from said back plate and move said pressure plate toward said driven member with the effective distance between said fulcrum point and said pivot point increasing as the lever moves in said first direction and decreases as the lever moves in a direction opposite to said first direction.

16. In a spring loaded clutch of the type having a driving and a driven member and wherein a portion of said driving member is operative to be moved into and out of frictional driving engagement with said driven member, the combination comprising
  (a) lever means carried by said driving member and operatively connected to said portion and being operative to move the latter into and out of frictional engagement with said driven member,
  (b) resilient means of the compression type carried by said driving member and being expandable for imposing a resilient load on said lever means so that the latter moves said portion into engagement with said driven member and said resilient means imposes its resilient load on said portion through said lever means and biases said portion into engagement with said driven member,
  (c) said lever means and said resilient means including means for constantly increasing the effectiveness of said resilient means in applying its resilient load on said lever means regardless of any change in the resilient load of said resilient means as it expands when said portion moves toward said driven member.

17. In a clutch comprising in combination driving and driven members having surfaces adapted to engage one another, a pressure member for causing such engagement, a plurality of pressure transmitting levers each pivotally supported near the outer end thereof which is arranged to transmit pressure to the pressure member, each of said levers being engaged by a separate spring means individual thereto acting between the pivot and the inner end of said lever at such a distance from the pivot that the pressure of the spring means is multiplied in the action of the lever on the pressure member, said lever being movable manually in the other direction at its inner end at a point farther removed from the pivot than the aforesaid spring means, whereby to secure mechanical advantage in relieving the spring pressure from the pressure member, the improvement which consists in providing means connecting said spring means to said lever for continuously increasing the effectiveness of the biasing effect of said spring on said lever as said pressure member moves toward engagement.

18. In a spring loaded clutch of the type having a driving and a driven member and wherein a first portion of said driving member is a reaction means and a second portion of said driving member is operative to be moved relative to said first portion and into and out of frictional driving engagement with said driven member, a resilient means for reacting against said first portion of said driving member and acting against the second portion of the driving member for biasing said second portion into engagement with the driven member, and effectiveness compensating means connecting said resilient means to said first and second portions for continuously increasing the effectiveness of the biasing force of said resilient means as said second portion moves toward frictional engagement with the driven member and for continuously decreasing the effectiveness of the biasing force of said resilient means as said second portion moves away from frictional engagement with said driven member.

19. In a spring loaded clutch of the type having a driving and a driven member and wherein a first portion of said driving member is a rotatable reaction means and a second portion of said driving member is in the form of a pressure plate drivingly connected to said first portion and movable relative thereto into and out of frictional engagement with said driven member,
  (a) resilient means having action and reaction ends with said reaction end being adapted to react against said first portion of said driving member and said action end being adapted to react against the second portion of said driving member for biasing said second portion into engagement with the driven member, and
  (b) effectiveness compensating means in the form of fulcrum means pivotally connecting said resilient means to said first and second portions and allowing said resilient means to pivot relative to at least one of said portions during engaging and disengaging movement of said second portion for continuously increasing the effectiveness of the biasing force of said resilient means as said second portion moves toward frictional engagement with the driven member and for continuously decreasing the effectiveness of the biasing force of said resilient means as said second portion moves away from frictional engagement with said driven member.

20. In a spring loaded clutch according to claim 19
  (a) wherein said resilient means is axially elongated with the action and reaction ends thereof being axially spaced,
  (b) the axis of said resilient means being disposed at an angle with respect to the first portion of said driving member, and
  (c) said effectiveness compensating means induces said resilient means to assume a larger angular relationship with said first portion as said second portion moves toward frictional engagement with said driven member and toward a position beyond the original frictional engagement as said driven member wears and induces said resilient means to assume a smaller angular relationship with said first portion as said second portion moves away from frictional engagement with the driven member for continuously increasing the effectiveness of the biasing force of said resilient means as said second portion moves toward frictional engagement with the driven member and for continuously decreasing the effectiveness of the biasing force of said resilient means as said second portion moves away from frictional engagement with said driven member.

References Cited by the Examiner
UNITED STATES PATENTS

| | | | |
|---|---|---|---|
| 2,727,612 | 12/1955 | Thelander | 192—68 |
| 2,765,892 | 10/1956 | Reed | 192—68 |
| 3,128,862 | 4/1964 | Ludwig | 192—68 |

DAVID J. WILLIAMOWSKY, *Primary Examiner.*